United States Patent
Weininger et al.

(10) Patent No.: US 7,593,939 B2
(45) Date of Patent: Sep. 22, 2009

(54) GENERATING SPECIALIZED SEARCH RESULTS IN RESPONSE TO PATTERNED QUERIES

(75) Inventors: Nicholas Brock Weininger, San Francisco, CA (US); Ramanathan V. Guha, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 11/694,490

(22) Filed: Mar. 30, 2007

(65) Prior Publication Data

US 2007/0239716 A1 Oct. 11, 2007

Related U.S. Application Data

(60) Provisional application No. 60/790,319, filed on Apr. 7, 2006.

(51) Int. Cl.
G06F 7/00 (2006.01)
G06F 17/30 (2006.01)
(52) U.S. Cl. .................. 707/6; 707/1; 707/3; 707/4; 707/10
(58) Field of Classification Search .............. 707/1, 707/3, 4, 6, 10
See application file for complete search history.

(56) References Cited

U.S. PATENT DOCUMENTS

| | | | |
|---|---|---|---|
| 5,664,173 A * | 9/1997 | Fast ............................ | 707/4 |
| 7,366,723 B2 * | 4/2008 | Shaburov ...................... | 707/10 |
| 2002/0091680 A1 * | 7/2002 | Hatzis et al. ................. | 707/3 |
| 2003/0130994 A1 * | 7/2003 | Singh et al. .................. | 707/3 |
| 2005/0257157 A1 * | 11/2005 | Gilboa et al. ............... | 715/747 |
| 2005/0267871 A1 * | 12/2005 | Marchisio et al. ............ | 707/3 |
| 2006/0074942 A1 * | 4/2006 | Shaburov .................... | 707/100 |
| 2006/0074967 A1 * | 4/2006 | Shaburov .................... | 707/102 |
| 2006/0143159 A1 * | 6/2006 | Chowdhury et al. .......... | 707/3 |
| 2006/0155693 A1 * | 7/2006 | Chowdhury et al. .......... | 707/4 |
| 2006/0155694 A1 * | 7/2006 | Chowdhury et al. .......... | 707/4 |
| 2007/0078822 A1 * | 4/2007 | Cucerzan et al. ............. | 707/3 |

OTHER PUBLICATIONS

"Query Processing in Very Large XML Database"—Ghassan Z. Qadah—2005/IEEE CCECE/CCGEI, Saskatoon, May 2005, (pp. 1107-1111 or 1-5).*
"Structural Joins: A Primitive for Effective XML Query Pattern Matching"—Khalifa et al.—2002 IEEE, Proceedings of the 18th International Conference on Data Engineering (ICDE'02) (pp. 1-12).*

* cited by examiner

Primary Examiner—John E Breene
Assistant Examiner—Anh Ly
(74) Attorney, Agent, or Firm—Fenwick & West LLP

(57) ABSTRACT

Third party content providers can specify parameters for generating specialized search results in response to queries matching specific patterns. In this way, a generic search website can be enhanced to provide specialized search results to subscribed users. In one embodiment, these specialized results appear on a given user's result pages only when the user has subscribed to the enhancements from that particular content provider, so that users can tailor their search experience and see results that are more likely to be of interest to them. In other embodiments the specialized results are available to all users.

38 Claims, 9 Drawing Sheets

GENERATING SPECIALIZED SEARCH RESULTS IN RESPONSE TO PATTERNED QUERIES

CROSS-REFERENCE TO RELATED APPLICATIONS

This patent application claims priority from U.S. Provisional Patent Application Ser. No. 60/790,319, filed Apr. 7, 2006, for "Specifying Output Generation in Response to Patterned Queries", which is incorporated herein by reference.

FIELD OF THE INVENTION

The present invention is related to display of specialized search results, and more particularly to mechanisms to allow third party content providers to create enhancements to a search result page triggered on queries matching certain patterns.

DESCRIPTION OF THE BACKGROUND ART

When users search for websites and other information on the Internet, they may not always obtain the desired results. In many cases, users must carefully formulate their queries in order to obtain the information they are seeking. Some users, particularly novice users, do not have the skills, expertise, knowledge, experience, or patience to formulate a query that will yield the desired information.

Website authors, on the other hand, often have such expertise and are able to formulate queries that will provide information likely to be of use to visitors of those websites. Specialized search functionality often appears on websites, allowing visitors to those websites to see search results tailored to the particular content they are likely to be interested in, based on the fact that they are searching from that website. For example, a website devoted to traffic information can interpret a query such as "Interstate 280" differently than a general-purpose search site would provide. The fact that a user is visiting the traffic information website means that he or she is interested in traffic information.

However, it is not always convenient for users to visit a particular website in order to perform such a specialized search. Users may wish to perform all (or most) of their searches on a general-purpose search site, such as www.google.com, without having to visit different websites to perform different searches. Accordingly, it would be useful if third-party content providers could enable specialized searches on general-purpose search sites.

Furthermore, different users have different preferences, needs, and interests. Some users might be interested in searches relating to television shows, while other users may be interested in searches relating to weather around the world. It would be beneficial, therefore, for users to have the ability to specify which types of specialized searches they are interested in, so that specialized search results could be tailored to those affirmed areas of interest.

SUMMARY OF THE INVENTION

The present invention allows third party content providers to create enhancements to a search result page triggered on queries matching certain patterns. In one embodiment, these specialized results will appear on a given user's result pages only when the user has subscribed to the enhancements from that particular content provider, so that users can tailor their search experience and see results that are more likely to be of interest to them.

In response to a query matching a given pattern, the system of the present invention generates one or more of the following:

links to useful external sites, including deeplinks using URL patterns based on the query;
text giving status or factual information about some category of thing, allowing the user to get answers to some set of questions directly on the result page without having to click through to an external site;
links and text (and optionally richer interface primitives) that allow the user to interact usefully with external providers; and/or
IFRAMED content hosted on 3rd party servers.

An application programming interface (API) allows third party content providers to specify parameters for including their specialized results in search result pages. The content providers can thus particular types of information to be displayed in particular formats, in response to certain kinds of queries.

The content provider specifies parameters; i.e., what type of search query will trigger retrieval of content from that provider. The content provider also specifies how the search query will be parsed, and how the extracted query terms will be used to retrieve content. Finally, the content provider specifies how the retrieved content will be displayed in the user's browser window. In one embodiment, users can select which types of specialized search results they wish to receive, and add them to their results pages in order to enhance their search experience with the third-party content.

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In the following description, the term "subscribed link" is used to refer to a mechanism by which the user can indicate that he or she is interested in receiving a particular category of search results. The category of search results is usually based on some query pattern, as described in more detail below. The term "subscribed" refers to the fact that the user can freely opt in or out of the search results category, in effect turning on or off the subscription.

In one embodiment, however, the search results category can be provided to all users. Alternatively, the search results category can be provided to some users based on some criteria (such as browser platform, OS platform, geographical location, search history, demographics, website visitation history, or the like). In effect, then, those users for which the criteria apply can be auto-subscribed to certain links. In one embodiment, users are free to opt out after they have been auto-subscribed; in other embodiments, they may not have the freedom to do so.

In the following description, the term "specialized result" refers to any result that is generated by the patterned query/response mechanism described herein, whether or not the initiating link is a subscribed link.

Server Infrastructure

Figure 7:
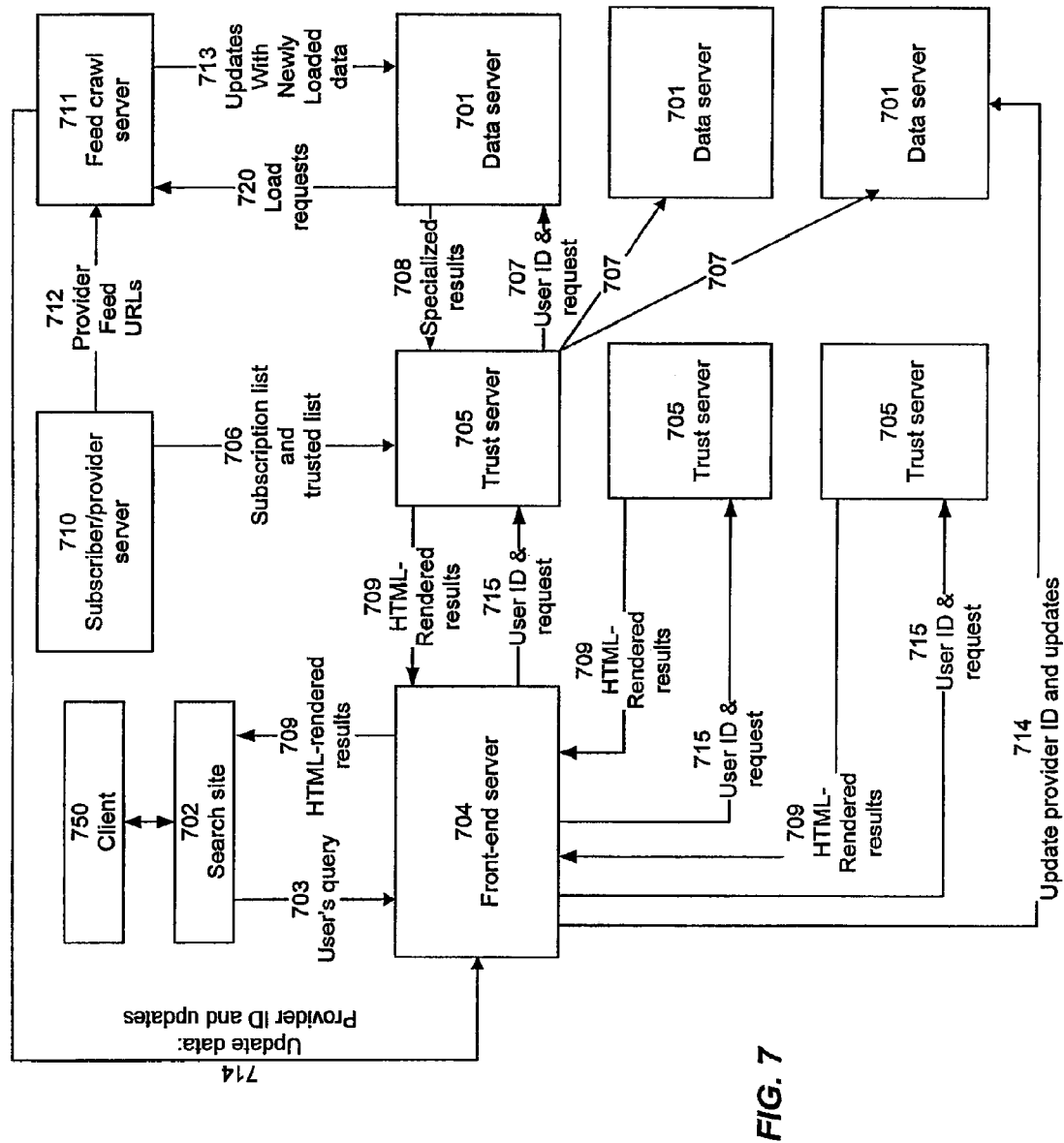
FIG. 7 is a block diagram that depicts an example of a system for practicing the present invention.

Referring now to FIG. 7, there is shown an example of a system 700 for practicing the present invention. One skilled in the art will recognize that the architecture shown in FIG. 7 and described herein is presented for illustrative purposes only, and that the present invention can be practiced with other architectures as well.

Figure 8:
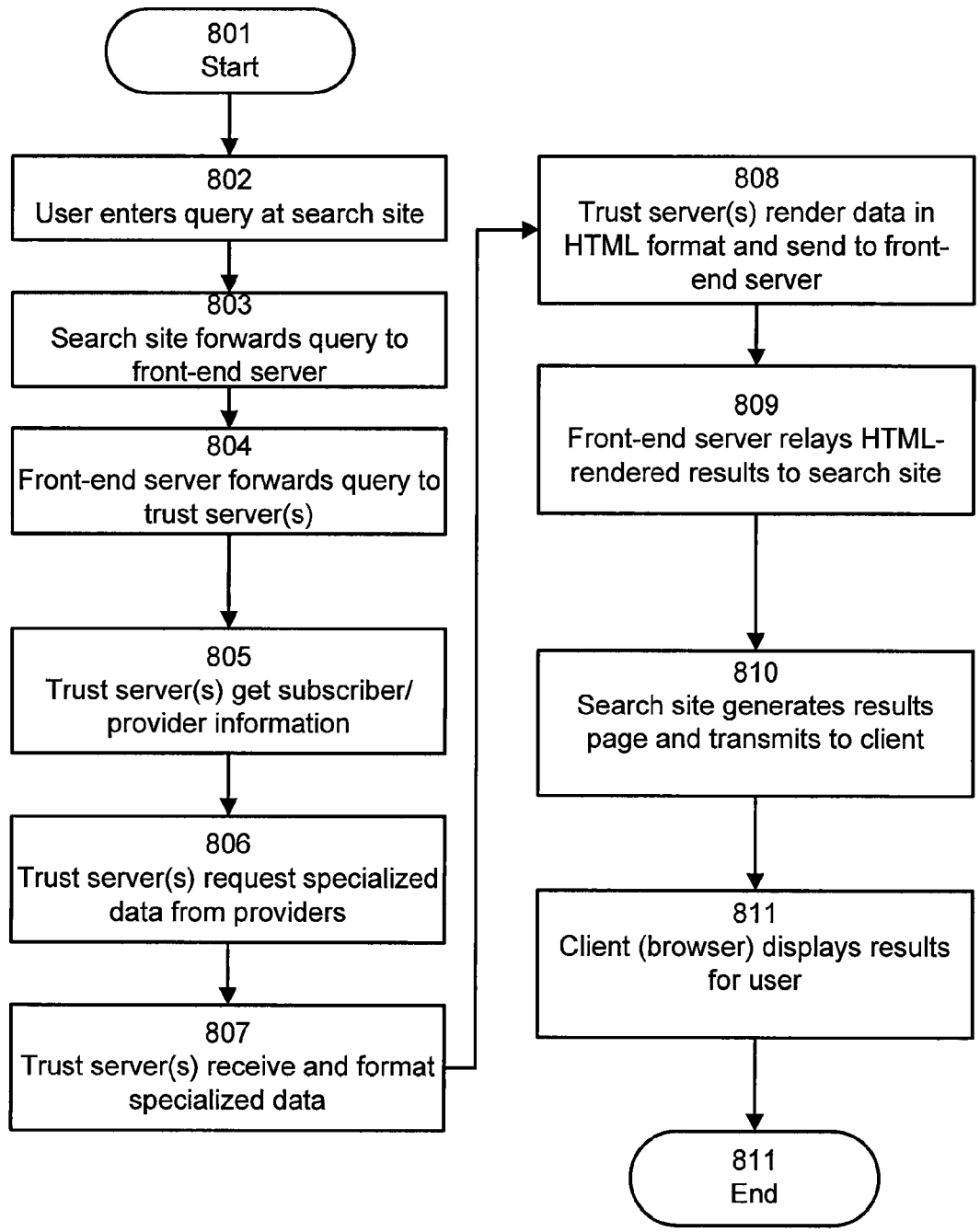
FIG. 8 is a flowchart showing an example of a method for practicing the present invention according to one embodiment.

Referring also to FIG. 8, there is shown an example of a method for practicing the present invention according to one embodiment.

In one embodiment, the present invention is implemented using a data server or collection of data servers 701. These servers store knowledge base data and query/result specification files submitted by various content providers. The format and function of these specification files are described in further detail below.

Using client 750, a logged-in user enters 802 a query at a search website 702, which may be a general purpose search site such as www.google.com. In one embodiment, the user is logged in so that he or she can be identified, and so that a determination can be made as to which (if any) links the user has subscribed to. The user's query 703 is sent 803 to a front-end server 704. The front-end server 704 passes 804 the request 815 to one or more trust servers 705, which perform the following steps:

First, the trust server 705 retrieves 805 a list 706 of the content providers which the user "trusts" enough that specialized results from them should be presented to the user. This includes all explicit, direct subscription decisions the user has made. In one embodiment, it may also include indirect trust relations and/or experimental recommendations. List 706 includes provider feed URLs so that the data for subscribed links can be obtained from the appropriate source.

For each provider in the list 706, the trust server 705 sends 806 a request 707 to the appropriate data server 701 to get specialized results for that content provider for the query 703. Data servers 701 can be sharded according to well known techniques.

Specialized results 708 are returned 807 to trust server 705, which renders 808 the results in an HTML form and sends the HTML-rendered results 709 to front-end server 704. In one embodiment, this rendering is performed by a component external to trust server 705. For example, the rendering may be performed by a renderer (not shown) implemented as a library linked into the trust server 705; alternatively, it can be implemented as a call-out to a server, such as for example a Google Gadgets server, in order to support close integration with an API such as the Google Gadgets API. The renderer handles decisions such as, for example, what to display if the total number of specialized results 708 returned is too large to fit them all in the available display space. One skilled in the art will recognize that the results need not be formatted in HTML, but that any other format can be used.

Once the rendered results 709 are provided to the front-end server 704, they are relayed 809 to search site 702 for drop-in display by search site 702 (possibly along with other search results). Search site 702 generates 810 a results page and transmits it to a browser running at the client 750. The client browser then displays 811 the results for the user. As shown in the examples described below, the specialized rendered results 709 can be displayed in a visually distinct manner (such as within a shaded box) so as to distinguish them from ordinary search results; alternatively, no special visual distinction can be made.

Each individual data server 701, when it receives a call to provide specialized results for a given query and provider, processes the query according to the list of specialized results for that provider, extract appropriate knowledge base elements. The data server 701 formats the results according to the output templates specified by the provider.

The subscriber/provider server 710 allows users to subscribe to and unsubscribe from specialized results offered by particular content providers, and also allows providers to upload the locations of XML files defining their specialized results.

Feed crawl server 711 handles loading of actual XML data files from content providers' websites, based on a list 712 of provider feed URLs received from subscriber/provider server 710. The feed crawl server 711 converts XML into an internal protobuffer format used by the data servers 701. The feed crawl server 711 validates the data and sends updates 713 to data server 701 shards when the data changes. Load requests 720 are generated when a data server 701 receives a request for subscribed links from a provider it does not have in its memory. The data server 701 sends the load request 720 to the feed crawl server 711 so that the feed crawl server 711 will fetch the data for that provider.

Changes to user subscription information are handled by a trust relations server architecture. When a provider's information changes, the feed crawl server 711 broadcasts update requests 714 to the front-end servers 704, which then passes them onto the appropriate data server 701 shards.

In one embodiment, each data server 701 supports the following operations:
  Process a query for a given set of providers, retrieving all specialized results that match the query.
  Update data by reading the latest specifications and/or knowledge base data for a provider from the feed crawl server 711 or a local data file, and optionally add and/or delete some specified objects.

The front-end server 704 has the following responsibilities with respect to the data server 701 shards it controls:
  Keep track of the per-provider sharding and forward specialized data requests on to the appropriate data server 701 shards when a user makes a query.
  Forward update data requests to the appropriate data server 701 shards when a provider modifies specifications or knowledge base data.
  Search site 702 receives 801 a query from a user.

The architecture shown in FIG. 7 and the method shown in FIG. 8 will be further described in the context of several examples. However, the particular features of the examples are intended to be illustrative rather than limiting. One skilled in the art will recognize that the invention can be practiced in different ways.

API for Generating and Displaying Specialized Search Results

In one embodiment, the present invention is implemented as an Application Programming Interface (API) that allows third parties to specify parameters for displaying specialized information in response to particular queries. The parameters may be provided, for example, in the form of an XML file.

In one embodiment, the content provider defines one or more ResultSpecs tags. A ResultSpec tag contains a Query tag and a Response tag. The Query tag provides a general trigger pattern of queries that will cause the content provider's results to be obtained and displayed. The Response tag provides a template for the display of the content provider's results when the trigger pattern is satisfied.

The ResultSpec tag can also have an id attribute to uniquely identify the ResultSpec. In one embodiment, every ResultSpec has an id attribute.

For example, the following specification would display a "Hello World" informational message whenever the user enters the query "subscribed links":

```
<ResultSpec id="InfoMatch">
    <Query>subscribed links</Query>
    <Response>
        <Output name="title">Google Subscribed Links API</Output>
        <Output name="more_url">www.google.com/subscribed_links</Output>
        <Output name="text1">Hello, world!</Output>
        <Output name="text2">Google Subscribed Links allow you to put your own</Output>
        <Output name="text3">content on the Google search results page.</Output>
    </Response>
</ResultSpec>
```

In this example, the ResultSpec tag has an id of InfoMatch. The Query tag specifies that the result will display in response to one specific query, namely "subscribed links". On any other query, the result will not display. Each Output tag has a name attribute that specifies the place where that particular part of the output will appear in the displayed result. The output named title will be the anchor text for a title link; the more_url output gives the URL which that link points to; and the text1, text2, text3 outputs define three lines of body text.

Figure 1:
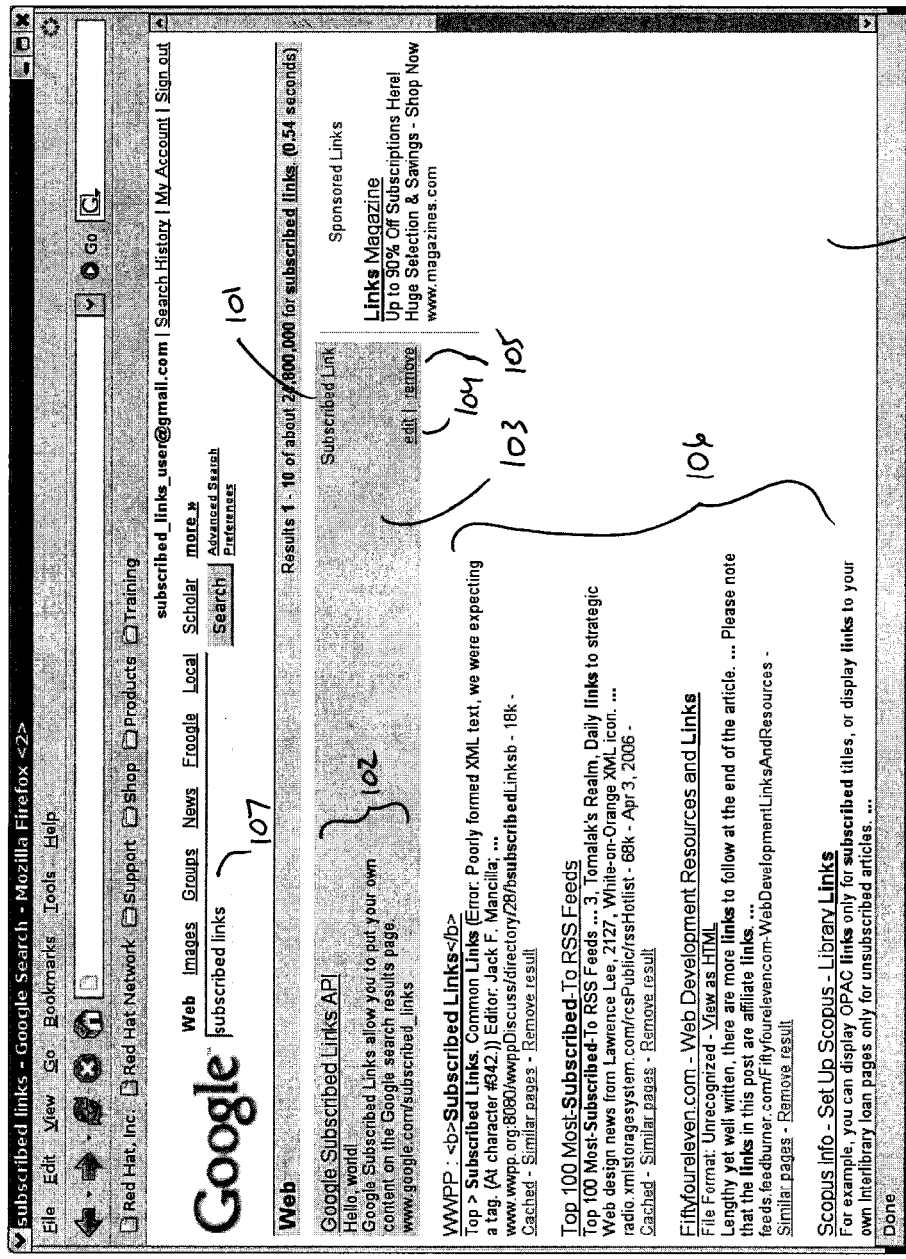
FIG. 1 depicts an example of a results screen including a specialized search result.

Referring now to FIG. 1, there is shown an example of a result screen 100 generated by the code of the above example in response to query 107. The specialized search result 102 is shown in a highlighted box 103 which distinguishes specialized result 102 from other results 106. The words "Subscribed Link" 101 in the upper right corner of the result 102 indicate that users must subscribe in order to see this specialized result 102. In one embodiment, a user must subscribe in order to indicate that he or she would like that content provider's specialized results to appear on his or her result pages; in another embodiment, there is no requirement for the user to subscribe.

Edit link 104 allows the user to edit his or her list of subscribed links. Remove link 105 allows the user to remove the subscribed link that produced specialized result 102.

It can be seen from FIG. 1 that the text shown in result 102 is generated based on the Output tags presented in the above example of a ResultSpec tag.

Figure 9:
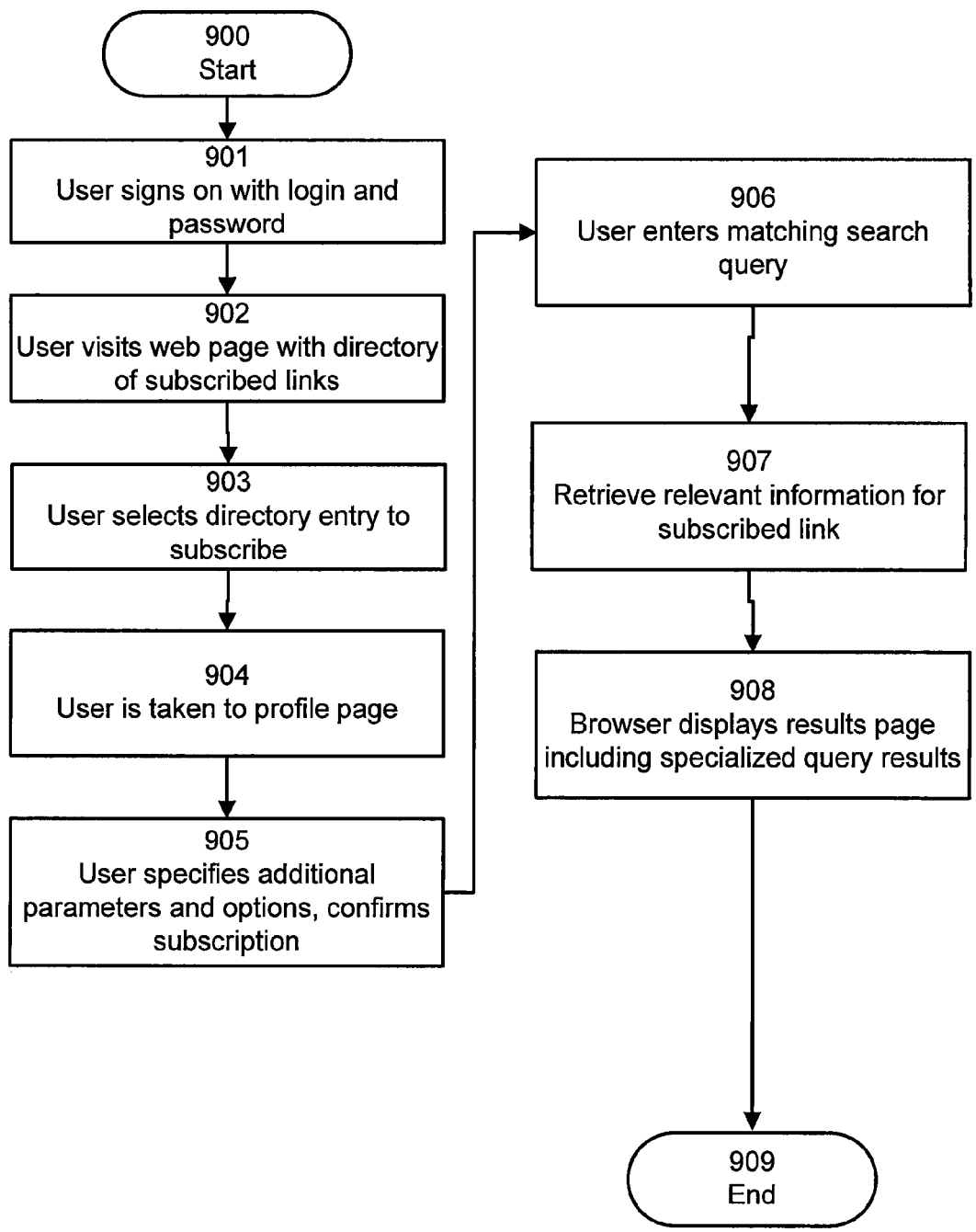
FIG. 9 is a flowchart depicting an example of a user's experience in interacting with the system of the present invention according to one embodiment.

Referring now to FIG. 9, there is shown a flowchart depicting an example of the user's experience in interacting with the system of the present invention according to one embodiment. The user configures search results to include specialized results as follows. First, the user signs on 901 with a login and password, so that he or she can be identified. In one embodiment, cookies can be used to store login information (including password if desired) on the user's machine so that manual login is not needed for each session. The user then visits 902 a web page that includes a directory of "subscribed links" that users can add to their search results. The user selects 903 an entry in the directory (by clicking on it) to subscribe to one of the subscribed links.

As mentioned above, in some cases, users can be automatically subscribed to certain subscribed links (categories of query results) based on any desired criteria.

Once the user has subscribed to a link (or once he or she has been auto-subscribed), the user is taken 904 to a profile page. Here, he or she can specify 905 additional parameters and options, and can confirm that he or she wants to subscribe.

Subsequently, when the user enters 906 a search query that matches the specified parameters, the relevant information is retrieved 907 and a results page is shown 907 that includes the content provider's results, as shown in FIG. 1 and according to the method described above in connection with FIG. 8.

If the user does not want to see specialized search results of a particular kind in the future, he or she clicks on the "remove" link 105 in the lower right corner of the result box 103 in order to unsubscribe from a particular subscribed link.

Creating Query Patterns

As illustrated in the above example, the Query item in the XML file defines the set of queries for which the specialized results will appear. In the above example, the pattern is very restrictive: it will only trigger on a single particular query. Theoretically, the content provider could write a separate ResultSpec for each individual query that is to trigger a specialized result. Generally, however, it is more efficient to specify a pattern that, when matched, will cause specialized results to be displayed. To create more powerful query patterns, the content provider can use types in the Query item and attributes in constructing the corresponding Response. The types refer to DataObjects, which are discussed below.

For example, suppose the content provider wishes to report speed limits on various highways. The content provider would like to have essentially the same result format for any query of the form "speed limit on X" where X is the name of a highway. The particular result would depend on the value of X (the name of the highway). To do this, the content provider can define a number of supporting DataObjects of type "Highway", each with an attribute called "max_speed_limit" giving the maximum speed limit on the highway. Then the content provider can define a Query and Response like this:

```
<ResultSpec id="HighwayMatch1">
    <Query>speed limit on [Highway]</Query>
    <Response>
        <Output name="title">Speed limit info for [0.fullname]</Output>
        <Output name="more_url">www.myspeedlimitssite.com/describe?hwy=[0.abbrev]</Output>
        <Output name="text1">The maximum speed limit on [0.fullname]</Output>
        <Output name="text2">is [0.max_speed_limit].</Output>
    </Response>
</ResultSpec>
```

Here, DataObjects in the Query are denoted by type names enclosed in brackets. In one embodiment, type names are case-sensitive.

In the Output lines of the Response, the content provider can refer to attributes of the extracted DataObjects, which are numbered starting from 0. These attribute references are also enclosed in brackets and are also case-sensitive.

Defining Data Objects

To make the "HighwayMatch1" Query and Response actually work, the content provider defines some DataObjects of type Highway. One such object might look like this:

```
<DataObject id="Highway101" type="Highway">
    <QueryName value="101"/>
    <QueryName value="US 101"/>
    <Attribute name="fullname" value="US Route 101"/>
    <Attribute name="abbrev" value="US101"/>
    <Attribute name="max_speed_limit" value="65 MPH"/>
</DataObject>
```

Thus, the definition of this DataObject fits into the ResultSpec example above, as follows:

The type attribute is the type used in brackets in the Query field of the ResultSpec.

The two QueryName tags provide two different names by which this object can be recognized in a query. In one embodiment, every DataObject has at least one QueryName; the more QueryNames a DataObject has, the more alternative ways there are to refer to it in queries.

Attribute names include fullname, abbrev, and max_speed_limit, all used in the Response from the example above.

Like the ResultSpec, the DataObject is uniquely identified by its id attribute. In one embodiment, every DataObject and every ResultSpec has its own unique id.

Combining Patterns and Objects

Figure 2:
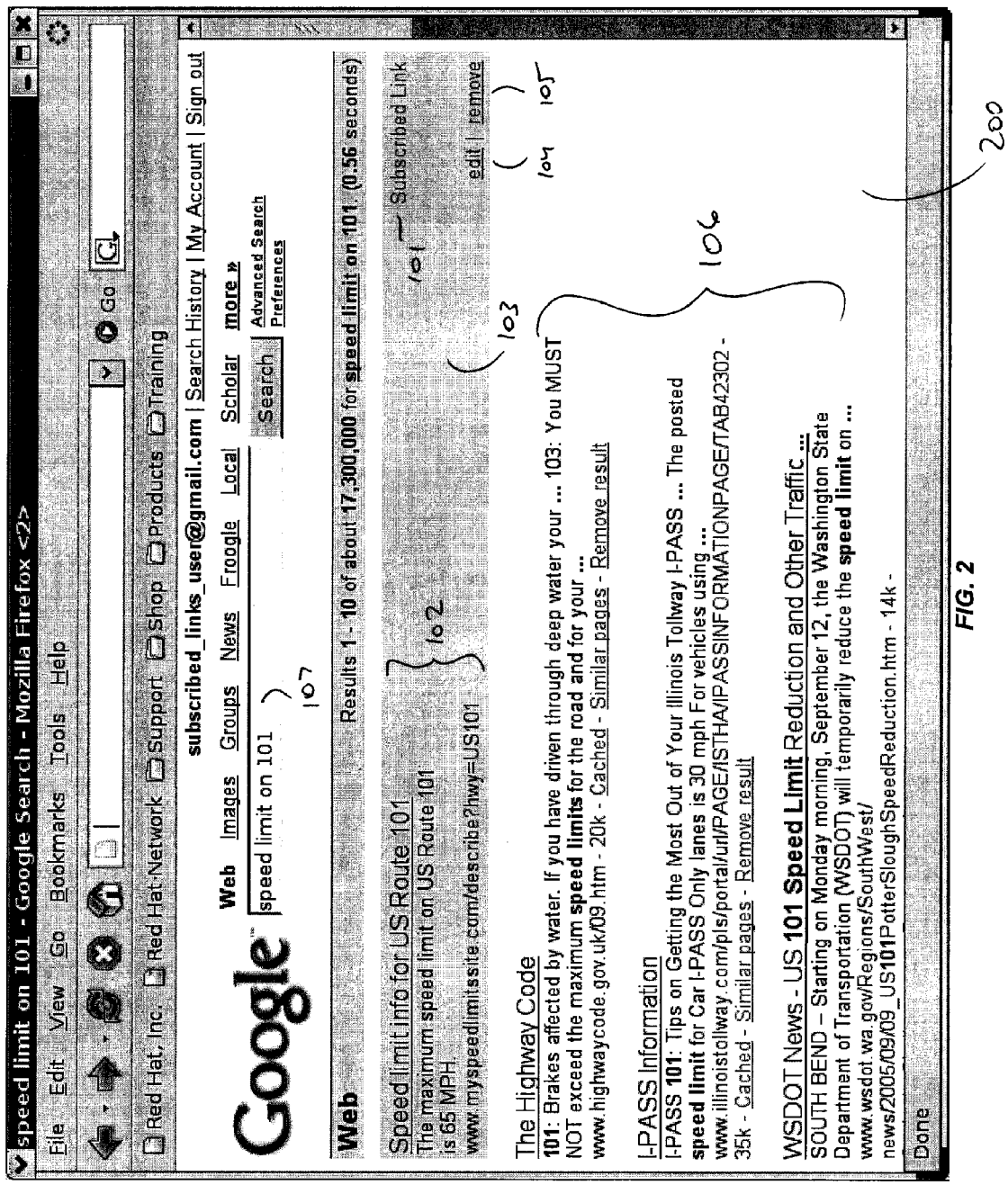
FIG. 2 depicts an example of a results screen including a specialized search result based on a pattern match.

Referring now to FIG. 2, there is shown an example of a results screen 200 including a specialized result 102. This example assumes that the content provider has generated an XML file containing both the ResultSpec and the DataObject as described above. The specialized search result 102 is shown in response to query 107. A result similar to FIG. 2 will be shown when the user searches on either "speed limit on 101" or "speed limit on US 101", because both of "101" and "US 101" will match the Highway object that was defined. To make results display for more speed limit queries, the content provider can define more DataObjects of type Highway, and does not have to add anything more to the ResultSpec.

The specialized result 102 in FIG. 2 is generated as follows. Query 107 ("speed limit on 101") matches the Query tag "speed limit on [Highway]", since a data object of type "Highway" has been defined as matching QueryName "101". The data object specifies other attributes for "Highway101", including a full name ("US Route 101"), an abbreviation ("US101"), and a speed limit ("65 MPH"). The Output tags in the ResultSpec indicate a format for including these attributes, along with accompanying text, in the displayed specialized result 102.

Completing the XML File

To complete the XML file that specifies Subscribed Links, the content provider adds a top-level Results tag. The content provider can also add an AuthorInfo tag giving some information about the author of the specification or of the content provider. The following is an example of a complete file:

```
<Results>
    <AuthorInfo description="Find highway speed limits" author="Joe Author"/>
```

```
    <ResultSpec id="HighwayMatch1">
        <Query>speed limit on [Highway]</Query>
        <Response>
            <Output name="title">Speed limit info for [0.fullname]</Output>
            <Output name="more_url">www.myspeedlimitssite.com/describe?hwy=[0.abbrev]</Output>
            <Output name="text1">The maximum speed limit on [0.fullname]</Output>
            <Output name="text2">is [0.max_speed_limit].</Output>
        </Response>
    </ResultSpec>
    <DataObject id="Highway101" type="Highway">
        <QueryName value="101"/>
        <QueryName value="US 101"/>
        <Attribute name="fullname" value="US Route 101"/>
        <Attribute name="abbrev" value="US101"/>
        <Attribute name="max_speed_limit" value="65 MPH"/>
    </DataObject>
</Results>
```

Output Format Options

As shown in the examples above, in one embodiment, a standard result format includes a title link and up to three lines of body text. In one embodiment, all HTML tags in the Output specification are automatically formatted accordingly. In one embodiment, output lines exceeding a character length limit are automatically clipped.

Besides the title link, the content provider can also include additional links in the body of the result, if desired. To do this, the content provider can specify a link for each line by adding more Outputs to the Response. The names of the Outputs are link1, link2, link3 (for the links' anchor text) and url1, url2, url3 (for the links' URLs). The number 1, 2, or 3 controls which line of the body text the link(s) will appear on. For example, to provide just one link in the body, but on the third line, then the Output names associated with that link should be link3, url3.

The content provider can specify links for some of the lines, leave some plaintext-only, or omit the plaintext entirely from a line leaving only the link.

Figure 3:
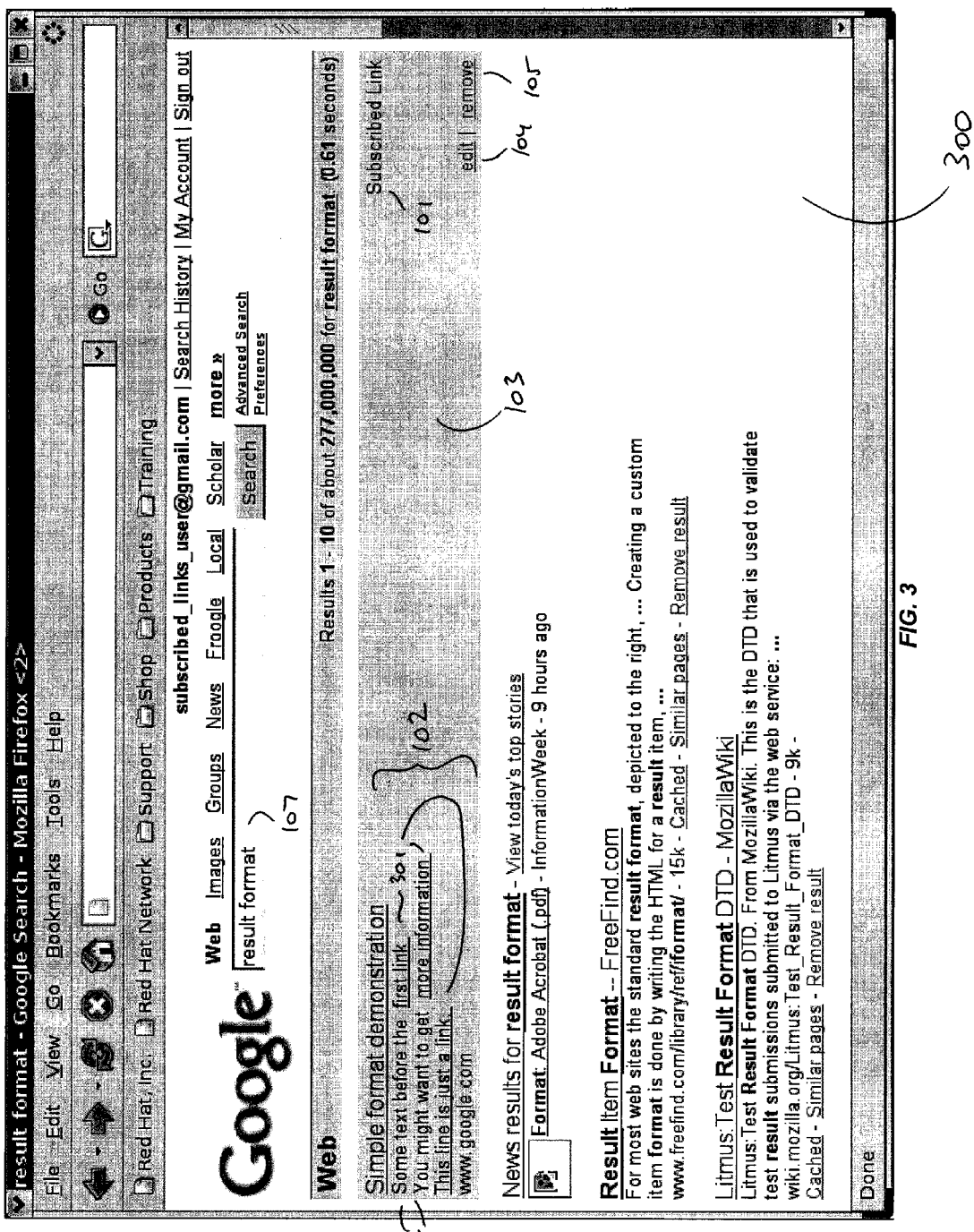
FIG. 3 depicts an example of a results screen including a specialized search result specifying a response format.

By default the body links will appear to the left of the text on each line. To change this, the content provider can set the format attribute of the Response tag to answer_right. So for example:

```
<ResultSpec id="FormatDemo">
    <Query>result format</Query>
    <Response format="answer_right">
        <Output name="title">Simple format demonstration</Output>
        <Output name="more_url">www.google.com</Output>
        <Output name="text1">Some text before the</Output>
        <Output name="link1">first link</Output>
        <Output name="url1">www.foobar1.com</Output>
        <Output name="text2">You might want to get</Output>
        <Output name="link2">more information</Output>
        <Output name="url2">www.foobar2.com</Output>
        <Output name="link3">This line is just a link.</Output>
        <Output name="url3">www.foobar3.com</Output>
    </Response>
</ResultSpec>
``` will produce, on the query "result format", the output shown in screen shot 300 of FIG. 3, including links 301 and link text 302. Alternatively, if the attribute format="answer_right" were omitted from the Response tag, the links 301 on the first two lines would display to the left of the snippets of text 302.

Advanced Features

In some embodiments, any or all of the following features can also be provided, singly or in any combination.

Using Multiple Files

When the content provider submits a URL for the XML file defining its Subscribed Links, the form actually allows the content provider to specify more than one URL. If more than one is specified, the Subscribed Links will trigger based on the combined data from all the specified URLs. This can be useful, for example, if it desired to reuse lists of DataObjects created by others.

For example, if a content provider has an XML file containing a list of DataObjects of type Highway, and a separate XML file containing the ResultSpecs that use that list, then the first file can be made publicly available so that other content providers can use the existing list of DataObjects of type Highway.

Using Brackets and Backslashes

In the above examples, the bracket characters [ ] are used to set off types of extracted elements in Queries and attributes of extracted elements in Responses. If the content provider wishes to include these characters in the output or Query pattern, he or she can do so by prefixing the character with \ (backslash).

Special Object Types

In one embodiment, a number of common object types are available for use in Query patterns. By using one of these object types, the content provider avoids the need to provide his or her own DataObjects. Examples of such common object types include, without limitation:

Cities. The element specification [City] will match names of cities and towns in North America, given by city name with state or (for larger cities) by city name alone. So for example:

<Query>elevation of [City]</Query> will match queries like "elevation of San Francisco", "elevation of Springfield, Ill.", etc. The resultant extracted objects will have the following attributes which can be used in Responses:

fullname: the fullname of the city, with state/province; e.g. "San Francisco, Calif."

abbrev: the name of the city without spaces and with state/province abbreviation appended, e.g. "SanFranciscoCA"

zipcode: a zipcode in the city.

Regular expression matches. In one embodiment, the system of the present invention supports Perl Compatible Regular Expressions (PCREs) according to a standard format. The content provider can specify a regular expression to match in a query by prefixing it with "RE:". The attributes of the resultant object are the match groups of the regular expression; they are named "gr0", "gr1", and so on. So for example:

```
<ResultSpec id="REDemo">
    <Query>[RE:(\\d{1,3})\\.(\\d{1,3})\\.(\\d{1,3})\\.(\\d{1,3})] subnet</Query>
    <Response>
        <Output name="title">Subnet breakdown for [0.gr0].[0.gr1].[0.gr2].[0.gr3]</Output>
        <Output name="more_url">www.foo.com</Output>
        <Output name="text1">Class A subnet: [0.gr0]</Output>
        <Output name="text2">Class C subnet: [0.gr2]</Output>
```

Figure 4:
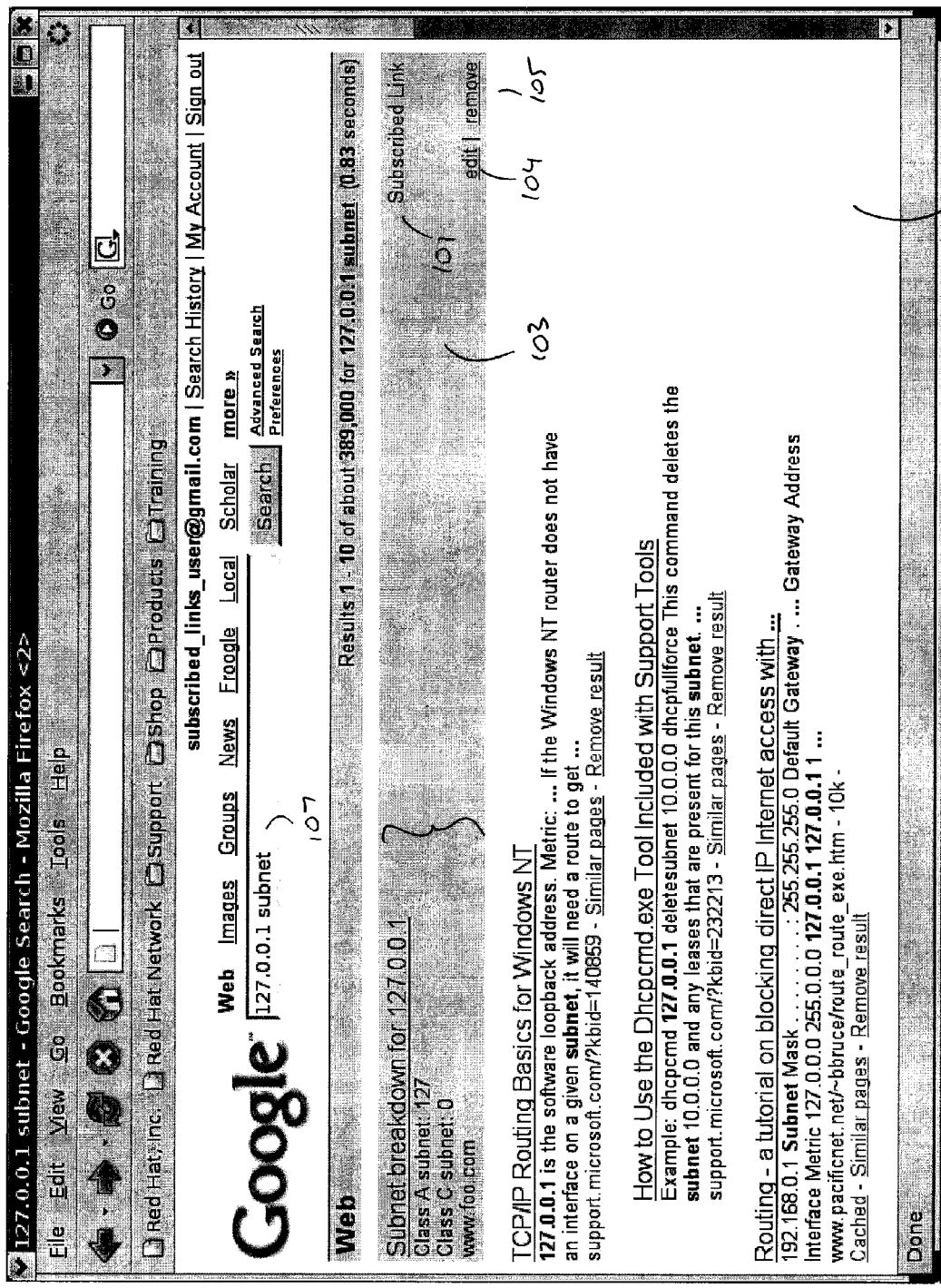
FIG. 4 depicts an example of a results screen including a specialized search result generated based on a regular expression.

```
    </Response>
</ResultSpec>
``` will match queries like "127.0.0.1 subnet". Referring now to FIG. 4, there is shown an example of a results screen 300 including a specialized search result 102 generated based on a regular expression, wherein query 107 matched the regular expression.

Dates. The element types "date", "timeofday", and "timerange" will match, respectively, dates, times of day, and time ranges in US-English format. So for example:

<Query>sunset on [date]</Query> will match queries of the form "sunset on X" where X is a date. The matcher is flexible enough to recognize different date formats, so "sunset on Nov. 22, 2005" and "sunset on October 16th" will both match.

The resultant objects have their own fixed sets of attributes. For "date" these are:

year: the year
mon: the month (1-12)
mon_name: the month name (January-December)
mday: the day of the month (1-31)
wday: the day of the week (1=Sunday, 7=Saturday)
wday_name: the weekday name
For "timeofday" they are:
hour_24: the hour on a 24 hour clock (0-23)
hour_12: the hour on a 12 hour clock (1-12)
ampm: "AM" or "PM"
min: the minute (0-59)
sec: the second (0-59)
For "timerange" they are "start_X" and "finish_X" where X ranges over all the "timeofday" attributes.

One skilled in the art will recognize that other built-in object types may also be provided.

Extractors

In addition to specifying objects to be found in the query itself, the content provider may specify additional elements to be obtained, given those already found. To specify an additional extracted element, the content provider adds an Extract tag to the ResultSpec that gives type name and an extraction specification. The extraction specification uses attributes of already-extracted elements in the same way that a Response does to construct a string, and then matches that string against the QueryNames of objects of the given type.

The following is an example:

```
<ResultSpec id="PopulationMatch1">
    <Query>population of [City] in [RE:(\\d{4})]</Query>
    <Extract type="CityPopulationData">pop_[0.abbrev]_[1.gr0]</Extract>
    <Response>
        <Output name="title">Population: [0.fullname] [1.gr0]</Output>
        <Output name="more_url">www.google.com</Output>
        <Output name="text1">The population of [0.fullname] in [1.gr0]</Output>
        <Output name="text2">was [2.population].</Output>
    </Response>
</ResultSpec>
<DataObject id="PopSFCA2000" type="CityPopulationData">
    <QueryName value="pop_SanFranciscoCA_2000"/>
    <Attribute name="population" value="776,733"/>
</DataObject>
```

This would trigger on the query "population of San Francisco in 2000", attempt to extract an additional DataObject of type "CityPopulationData" named "pop_SanFranciscoCA_2000", and display the result.

Figure 5:
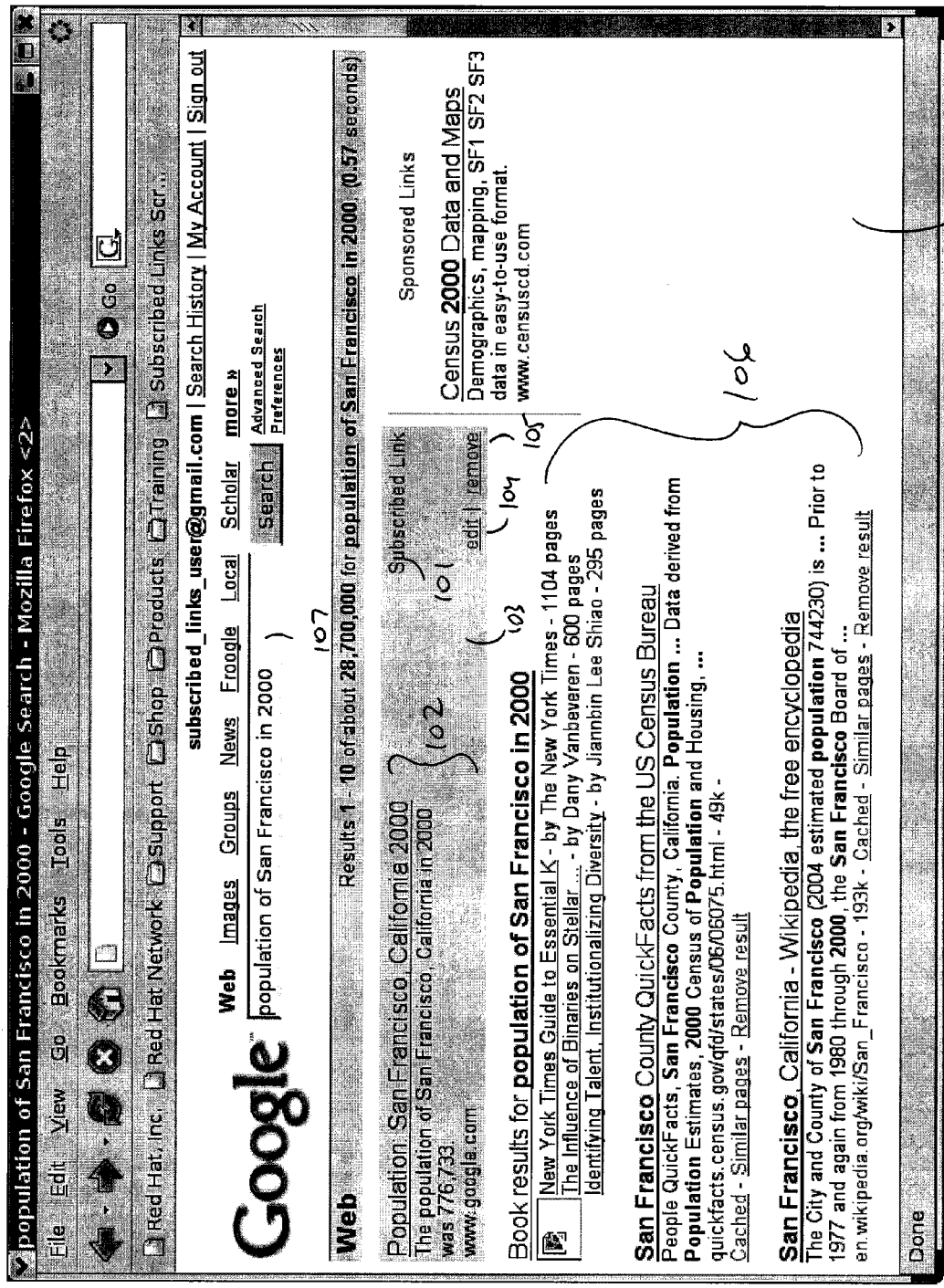
FIG. 5 depicts an example of a results screen including a specialized search result containing additional extracted elements.

Referring now to FIG. 5, there is shown an example of a results screen 500 wherein the specialized result 102 contains the additional extracted elements described above.

The content provider can include as many additional extracted objects as he or she wishes, and each one can use the attributes of all previous ones in constructing its extraction specification.

Validators

The content provider can use a Validate tag to restrict the set of queries on which a Response will be displayed. A Validate tag works much like an Extract tag: it uses two strings, the source and destination, which are populated using attributes of extracted elements. These two strings are then compared and the Response will display only if they are equal.

For example:

```
<ResultSpec id="RadioStationMatch1">
    <Query>frequency of [RadioStation] in [State]</Query>
    <Validate src="[0.state]" dst="[1.fullname]"/>
    <Response>
        <Output name="title">Population info for [0.fullname] in [1.gr0]</Output>
        <Output name="more_url">www.foo.com</Output>
        <Output name="text1">The broadcast frequency of [0.fullname]</Output>
        <Output name="text2">is [0.frequency].</Output>
    </Response>
</ResultSpec>
<DataObject id="CaliforniaState" type="State">
    <QueryName value="California"/>
    <Attribute name="fullname" value="California"/>
</DataObject>
<DataObject id="NewYorkState" type="State">
    <QueryName value="New York"/>
    <Attribute name="fullname" value="New York"/>
</DataObject>
<DataObject id="KQED" type="RadioStation">
    <QueryName value="KQED"/>
    <Attribute name="fullname" value="KQED-FM"/>
    <Attribute name="frequency" value="88.5"/>
    <Attribute name="state" value="California"/>
</DataObject>
<DataObject id="WMHT" type="RadioStation">
    <QueryName value="WMHT"/>
    <Attribute name="fullname" value="WMHT-FM"/>
    <Attribute name="frequency" value="89.1"/>
    <Attribute name="state" value="New York"/>
</DataObject>
```

With the definitions above, a result will trigger on the queries "frequency of KQED in California" and "frequency of WMHT in New York", but not on "frequency of KQED in New York". The reason is that the values for [0.state] and [1.fullname] must match in order for the specialized result to be triggered. This helps prevent ill-advised attempts to generate specialized results based on nonsensical combinations of terms. Since the state for KQED is "California" and the state for WHMT is "New York", the query will only match when the full name of the state as entered in the query matches the state for the radio station entered.

Reference Attributes

There are some circumstances where it is useful to have the value of an Attribute of a DataObject be, not a string literal, but a reference to another DataObject. The content provider can specify this by setting the Attribute's value equal to the ID of the DataObject to be referred to, and using multilevel attribute references (multiple attribute names separated by periods) in the Response accordingly. For example:

```
<ResultSpec id="RadioStationMatch1">
    <Query>population [RadioStation]</Query>
    <Response>
        <Output name="title">Info on [0.fullname]</Output>
        <Output name="more_url">www.foo.com</Output>
        <Output name="text1">The station [0.fullname]</Output>
        <Output name="text2">is located in a state with a population of [0.state.population].</Output>
    </Response>
</ResultSpec>
<DataObject id="CaliforniaState" type="State">
    <QueryName value="California"/>
    <Attribute name="fullname" value="California"/>
    <Attribute name="population" value="36,000,000"/>
</DataObject>
<DataObject id="KQED" type="RadioStation">
    <QueryName value="KQED"/>
    <Attribute name="fullname" value="KQED-FM"/>
    <Attribute name="frequency" value="88.5"/>
    <Attribute name="state" value="CaliforniaState"/>
</DataObject>
```

Figure 6:
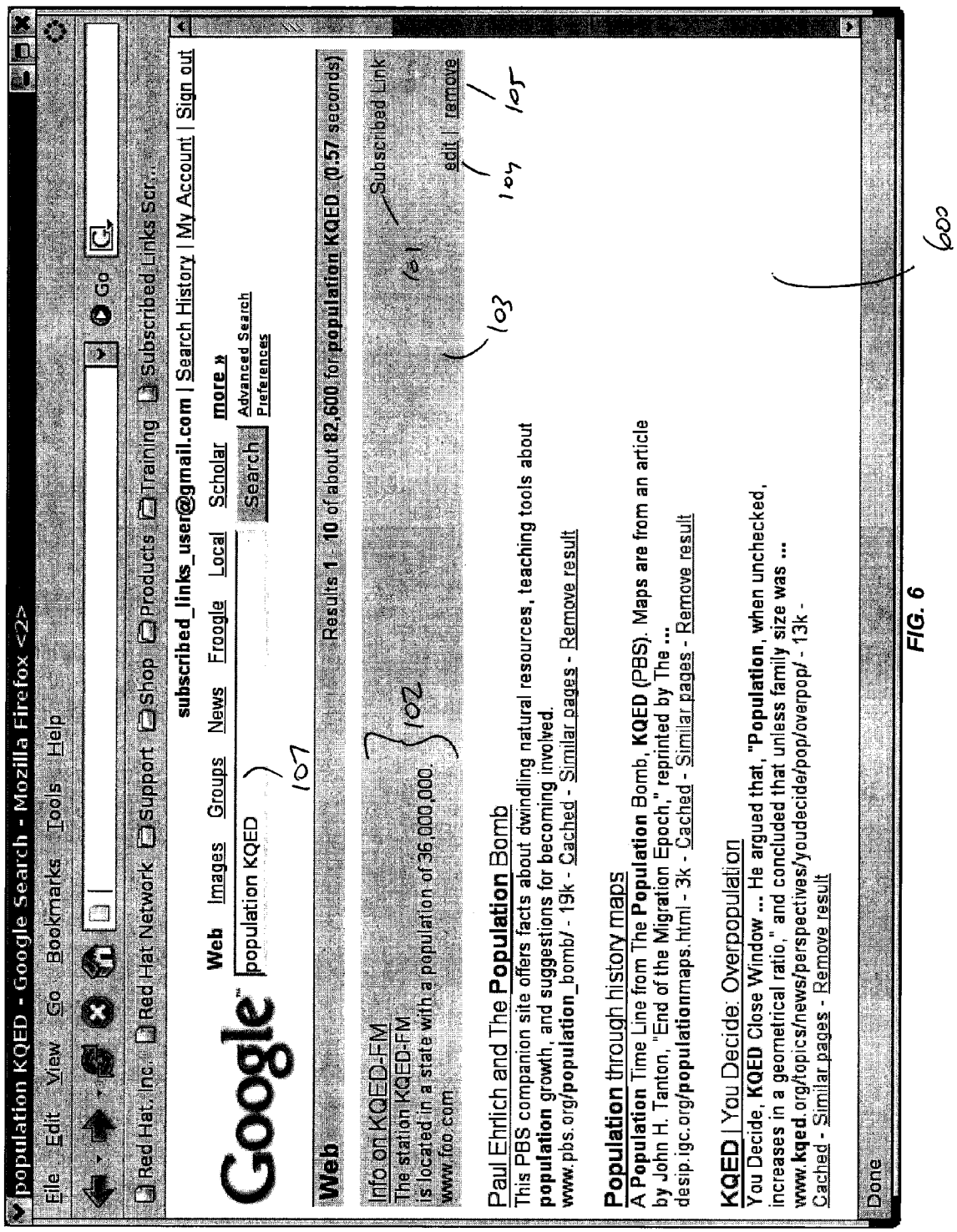
FIG. 6 depicts an example of a results screen including a specialized search result obtained using reference attributes.

This will trigger on the query 107 "population KQED" and produce the output, as shown in results screen 600 of FIG. 6. The output tag specifies that [0.state.population] should be displayed. This resolves to the population of the state associated with the record on which the query matched. Since the query was "Population KQED", the term "KQED" maps to [RadioStation]. The state for that data object is "CaliforniaState", which is an ID for another data object. Thus, to resolve [0.state.population], the CaliforniaState ID is consulted, which shows a value for "population" of "36,000,000". That value is then displayed.

Query Suggestions

In one embodiment, the present invention is also able to analyze query 107 and suggest alternative queries to the user. This can be implemented, for example, by comparing the entered query 107 with an index of results terms and selecting likely alternative query forms that (a) are similar to the entered query 107 and (b) would yield higher numbers of results if entered. In one embodiment, the alternative queries are presented as a clickable link that the user can activate if he or she is not satisfied with the displayed specialized links and regular links.

Auto-Subscription

In one embodiment, users can be automatically subscribed to a search results category based on some criteria (such as browser platform, OS platform, geographical location, search history, demographics, website visitation history, or the like). In effect, then, those users for which the criteria apply can be auto-subscribed to certain links. For example, a user who tends to search for information at automotive sites can be automatically subscribed to a search results category related to automobiles.

In one embodiment, users are free to opt out after they have been auto-subscribed; in other embodiments, they may not have the freedom to do so.

Testing and Troubleshooting Subscribed Links

In one embodiment, the content provider can test the operation of ResultSpecs before releasing them, to ensure that they trigger on the queries you expect them to and display the correct output. To do this for a particular ResultSpec, the content provider adds the attribute "test=true" to the ResultSpec tag, as in this example:

```
<ResultSpec id="HighwayMatch1" test=true>
    <Query>speed limit on [Highway]</Query>
    <Response>
        <Output name="title">Speed limit info for
[0.fullname]</Output>
        <Output
name="more_url">www.myspeedlimitssite.com/describe?hwy=[0.abbrev]
</Output>
        <Output name="text1">The maximum speed limit on
[0.fullname]</Output>
        <Output name="text2">is [0.max_speed_limit].</Output>
    </Response>
</ResultSpec>
```

Then the result specified by this ResultSpec will display when a specific user (such as the content provider him or herself) logs in to his or her Google Account and does a search matching the Query, but not when any other user who has added that content provider's Subscribed Links does searches.

In one embodiment, to ensure fairness, any given ResultSpec is only allowed a certain fixed amount of calculation time per query.

Specification Language

Specifying parameters for specialized search results is in general a three-step process:
1. Add to the knowledge base new types of elements that should be known to the query matcher, and list instances of these types.
2. Specify a pattern, containing elements of known types, to be matched.
3. Specify a result to be constructed using attributes of matched elements.

These steps are all performed by writing an XML file as described above. Also supported is the ability to extract additional elements using strings derived from the elements matched so far, and also a validation step where a string generated from matched elements is compared to an expected value before output generation is allowed to proceed.

In one embodiment, the system of the present invention also provides the capability to perform richer calculations on attributes of matched elements in a manner, or to write more complex algorithms for making query trigger decisions. Third parties can write their own code for these purposes. In one embodiment, only highly trusted third parties are given permission to submit such transforms.

Server Deployment and Sharding Policy

In one embodiment, the present invention is implemented using a number of datacenters. Each datacenter has a full complement of servers including data server 701 shards, supporting front-end servers 704 and Prose trust servers, at least one feed crawler, and at least one front end server.

Latency penalty is controlled by sending queries for specialized results at the very beginning of the query cycle, even before spell correction and query rewriting, since only the raw query is required.

In one embodiment, sharding of specialized data is performed by content provider, since each content provider has a distinct set of knowledge base data that to be accessed when matching queries for that provider's specialized results. Two sets of data server 701 shards are provided: one for specialized results provided by the operator of the system or by trusted third parties, and the other for general, untrusted content providers. Sharding is distinct from replication here; each shard, handling a certain set of providers, is replicated at least twofold for load-balancing and fault-tolerance purposes; and trusted shards may need a different (presumably higher) degree of replication than untrusted shards.

Assigning a content provider can be done simply by modding the provider's ID by the number of shards of its type (trusted or untrusted). This should work fine going forward for untrusted providers, as random distribution of IDs will ensure a good "spread" of providers across shards, and each provider's data size will be limited. Alternatively, for trusted providers, in one embodiment special sharding rules are implemented, as some providers may need to submit so much data that they will crowd other providers out of their shards. In one embodiment, multiple provider IDs are provided for some providers whose data sizes are so large as to require them to be split across multiple machines.

In one embodiment, as space fills up, old provider data from memory is deleted in order to fit in new data in response to queries; shards flush providers from memory on a least-recently-used basis. In some cases, the system may stop allowing new untrusted providers until more machines are available.

Implementing Specialized Results

A request for specialized results consists of a query 107 and a set of content providers. For each content provider listed, the query is matched against all trigger patterns for that content provider. For this purpose a structure is maintained called a OneboxSet for each content provider. When doing the matching for a particular content provider, the system makes reference to the knowledge base objects that content provider has defined; thus the knowledge base structure (called a KB) is divided into KBSegments, each KBSegment representing the objects defined by one content provider.

For each trigger pattern a content provider specifies, the system determines whether a given query matches that particular pattern and finds the conceptual objects corresponding to parameters specified in the pattern. To encapsulate this process, abstract base classes ObjectMatcher and MatchedObject are defined. An ObjectMatcher corresponds to a particular type of conceptual object; its Match routine decides whether a given string has a prefix matching an object of that type, and if so, outputs a MatchedObject. MatchedObjects are essentially attribute name-value maps; to use an attribute of an object in constructing the results of a triggering query, MatchedObject::GetAttribute is called.

The core work of matching queries is then done by subclasses of ObjectMatcher. LiteralKeywordMatcher checks that a string has a prefix literally equal to some given keyword or keyphrase. The one likely to be most commonly used is KBObjectMatcher, which operates by looking up tokenized prefixes of a query in a hash table of knowledge base objects. Special-purpose matchers are provided for regular expressions and for dates and times.

In order to speed up the matching process, in one embodiment a hash table is created for each provide. The keys of the hash table are the literal prefixes of the corresponding trigger patterns. For example, for the trigger pattern "flights from [City] to [City]", the literal prefix is "flights from". Then, when matching a query against a provider's set of trigger patterns, the system of the present invention considers those whose literal prefix matches a prefix of the query.

Accessing the Feed Crawl Server 711

As discussed above, in one embodiment the feed crawl server 711 uses a standard web crawling mechanism to crawl the XML files that content providers specify as the locations of their data; parse these files; and if the parse is successful, place the resulting data in its in-memory LRU (least-recently-used) cache. The feed crawler gets its crawling jobs in three ways. First, when a data server 701 shard receives a Get-ProseOneboxes request demanding data from a content provider it does not have in its memory, it issues a load request. Second, when a provider submits a new XML file location for specialized data, the feed crawler reloads that provider's data into its in-memory cache. Third, the feed crawler periodically polls providers' XML files for updates, broadcasting UpdateOneboxData requests when it detects new data; the polling schedule is determined by how often the provider has gotten into the cache previously.

Thus the data server 701 shards function as a first-level cache, and the feed crawler's memory as a second-level cache, for the data ultimately stored on the content providers' websites in XML format.

In one embodiment, a query to a data server 701 shard will only return specialized results if the specialized data for the specified content provider is in the data server 701 shard's memory at the time of the query. When the data server 701 issues a load request for content provider data it does not have, it will not wait for the load to happen before trying to return specialized results for the query that provoked the load request. Thus a user may occasionally fail to get specialized results if he or she happens to be the first person to submit a query.

Security Considerations

In one embodiment, the present invention is implemented in such a manner as to counter certain security threats. Examples of such threats include:

1. A malicious user submitting a specification whose output text is in some way destructive.
2. A malicious user submitting a specification whose time and/or space resource requirements are such that it will crowd out other provider's and/or exceed the capacity of servers to serve up.
3. A malicious user using data about the system to indirectly gain insights into confidential aspects of operations.

To deal with issue (1), in one embodiment the system of the present invention escapes all output strings from untrusted providers completely. Lengths of output strings are limited, so as to prevent excessive space consumption on the page as well as overflow attacks. These limitations may be relaxed or eliminated for more trusted providers, as long as they go through a review process in which their initial specifications and data are scrutinized.

To deal with issue (2), in one embodiment the data server 701 shards are subject to timeouts: after a certain number of milliseconds processing a given query, a shard will just stop and return whatever results it has for that query. Likewise, after a certain number of milliseconds waiting for data server 701 shards to return results from a GetProseOneboxes request, the front-end server 704 simply aggregates whatever results it has gotten so far and passes these back to the requester.

In one embodiment, a sharding policy is put into place as described above, to ensure that specialized results which have been promoted to show all users, or which come from more highly trusted providers, are on separate shards from those carrying completely untrusted providers' data. In this manner, their processing times for trusted providers are not affected by possible bad behavior of untrusted providers. Also, in one embodiment, if queries to a provider's data time out too often, that provider is deactivated for at least some period of time so as to allow other providers' data to trigger. Also, in one embodiment, fairness policies are enforced on the feed crawler end so that no one provider can take up too much update traffic.

As to issue (3), in one embodiment content providers can track most subscriptions to their specialized search results. The content providers therefore know how often users click through to their sites via their specialized search links.

A further line of defense against all issues above is that all untrusted content provider search results can be set up as opt-in. Users take positive action to subscribe to them, i.e. trust their providers, before they can be displayed. Furthermore, users can easily unsubscribe from content providers they find give them bad results, and can report spam, deception, copyright violations, and the like.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "calculating" or "determining" or "identifying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention have been described using commands, mnemonics, tokens, formats, syntax, and other programming conventions. The particular selections of the names, formats, syntax, and like are merely illustrative, and not limiting. Those of skill in the art can readily construct alternative names, formats, syntax rules, and so forth for defining context files and programming the operations a programmable search engine via context processing.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of generating specialized search results in response to patterned queries, comprising:
    receiving, for a specialized query type, a query pattern for which specialized results are to be displayed in response to receiving a search query matching the query pattern, wherein the received query pattern comprises:
        at least one data object having a type;
        at least one query name by which the data object can be recognized in the search query: and
        at least one attribute of the data object to be included in the specialized results;
    receiving, for the specialized query type, a specialized results pattern to be used in response to the query matching the query pattern, wherein the specialized results pattern comprises at least one attribute of the data object in the query pattern; and
    storing in a computer readable storage medium the query pattern and the specialized results pattern in a record associated with the specialized query type.

2. The method of claim 1, wherein the query pattern comprises an XML file.

3. The method of claim 1, further comprising:
    receiving at least one supporting data object for the specialized query type; and
    storing the supporting data object.

4. The method of claim 1, wherein the query pattern comprises at least a text string.

5. The method of claim 1, further comprising:
    receiving a search query;
    comparing the search query to the stored query pattern associated with the specialized query type;
    responsive to the search query matching at least one query name of the stored query pattern, generating at least one search result according to the specialized results pattern, including at least one attribute of the data object in the query pattern;
    responsive to the search query not matching the stored query pattern, generating at least one generic search result; and
    outputting the generated at least one search result.

6. The method of claim 1, further comprising:
    receiving a search query;
    comparing the search query to the stored query pattern associated with the specialized query type;
    responsive to the search query matching at least one query name of the stored query pattern:
        generating at least one search result according to the specialized results pattern, including at least one attribute of the data object in the query pattern; and
        generating at least one generic search result; and
        concurrently outputting a plurality of search results comprising the at least one search result generated according to the specialized results pattern and the at least one generic search result.

7. The method of claim 6, wherein concurrently outputting a plurality of search results comprises outputting a web page comprising the at least one search result generated according to the specialized results pattern and the at least one generic search result.

8. The method of claim 1, further comprising, responsive to user input requesting a subscription to the specialized query type, storing an indication that a user has subscribed to the specialized query type.

9. The method of claim 1, further comprising, responsive to user input requesting deletion of a subscription to the specialized query type, deleting a previously stored indication that a user has subscribed to the specialized query type.

10. A method of generating specialized search results in response to patterned queries, comprising:
    receiving a search query;
    comparing the search query to a stored query pattern associated with a specialized query type, wherein the stored query pattern comprises:
        at least one data object having a type and at least one query name by which the data object can be recognized in the search query; and
        at least one attribute of the data object to be included in the specialized results, the specialized query pattern associated with a specialized results pattern comprising at least one attribute of the data object in the query pattern;
    responsive to the search query matching at least one query name of the stored query pattern, generating at least one search result according to the specialized results pattern, including at least one attribute of the data object in the query pattern;
    responsive to the search query not matching the stored query pattern, generating at least one generic search result; and
    outputting the generated at least one search result.

11. The method of claim 10, wherein generating at least one search result according to the specialized results pattern comprises:
    extracting from the search query at least one query name of data object;

obtaining from the stored query pattern at least one attribute of the data object; and generating search result including the obtained attribute.

12. The method of claim 10, wherein outputting the generated at least one search result comprises transmitting the generated at least one search result to a client for display thereon.

13. The method of claim 10, wherein outputting the generated at least one search result comprises displaying the at least one search result on a display device.

14. The method of claim 10, wherein outputting the generated at least one search result comprises generating a web page comprising the generated at least one search result and transmitting the generated web page to a client for display thereon.

15. The method of claim 10, wherein outputting the generated at least one search result comprises generating a web page comprising the generated at least one search result and displaying the generated web page on a display device.

16. A method of generating specialized search results in response to patterned queries, comprising:
receiving a search query;
comparing the search query to a stored query pattern associated with a specialized query type, wherein the stored query pattern comprises:
at least one data object having a type;
at least one query name by which the data object can be recognized in the search query; and
at least one attribute of the data object to be included in the specialized results, the specialized query pattern associated with a specialized results pattern comprising at least one attribute of the data object in the query pattern;
responsive to the search query matching at least one query name of the stored query pattern:
generating at least one search result according to the specialized results pattern, including at least one attribute of the data object in the query pattern; and
generating at least one generic search result; and
concurrently outputting a plurality of search results comprising the at least one search result generated according to the specialized results pattern and the at least one generic search result.

17. A system of generating specialized search results in response to patterned queries, comprising:
at least one trust server, for storing in a computer readable storage medium, for a specialized query type, a query pattern for which specialized results are to be displayed in response to receiving a search query matching the query pattern and a specialized results pattern to be used in response to receiving a search query matching the query pattern, wherein the stored query pattern comprises:
at least one data object having a type;
at least one query name by which the data object can be recognized in the search query; and
at least one attribute of the data object to be included in the specialized results, and the specialized results pattern comprises at least one attribute of the data object in the query pattern; and
at least one data server, for obtaining specialized results from at least one content provider responsive to receiving a search query matching the query pattern.

18. The system of claim 17, wherein the query pattern comprises an XML file.

19. The system of claim 17, wherein the query pattern comprises at least a text string.

20. The system of claim 17, further comprising:
a front-end server, for receiving a search query and transmitting it to the at least one trust server;
and wherein the at least one trust server:
compares the search query to the stored query pattern associated with the specialized query type;
responsive to the search query matching at least one query name of the stored query pattern, generates at least one search result according to the specialized results pattern, including at least one attribute of the data object in the query pattern; and
responsive to the search query not matching the stored query pattern, generates at least one generic search result;
and wherein the front-end server transmits the generated at least one search result to a client for output.

21. The system of claim 17, further comprising:
a front-end server, for receiving a search query and transmitting it to the at least one trust server;
and wherein the at least one trust server:
compares the search query to the stored query pattern associated with the specialized query type;
responsive to the search query matching at least one query name of the stored query pattern, generates at least one search result according to the specialized results pattern, including at least one attribute of the data object in the query pattern; and
and wherein the front-end server transmits the generated at least one search result and at least one generic search result to a client for output.

22. The system of claim 17, further comprising a subscriber/provider server for storing an indication that a user has subscribed to a specialized query.

23. The system of claim 22, further comprising:
a front-end server, for receiving a search query and transmitting it to the at least one trust server;
and wherein the at least one trust server:
identifies a user that generated the search query;
compares the search query to at least one query name of the stored query pattern for a specialized query type to which the user has subscribed;
responsive to the search query matching the stored query pattern, generates at least one search result according to the specialized results pattern, including at least one attribute of the data object in the query pattern; and
responsive to the search query not matching the stored query pattern, generates at least one generic search result;
and wherein the front-end server transmits the generated at least one search result to a client for output.

24. The system of claim 22, wherein the subscriber/provider server stores an indication that a user has subscribed to a specialized query type responsive to user input requesting the subscription.

25. The system of claim 22, wherein the subscriber/provider server stores an indication that a user has subscribed to a specialized query type automatically responsive to a determination as to likelihood of user interest in the specialized query type.

26. The system of claim 25, wherein the determination as to likelihood of user interest in the specialized query type is made based on at least one selected from the group consisting of user characteristics, search history, site visitation history, geographic information, demographics, purchase history, and operating system characteristics.

27. The system of claim 17, wherein, responsive to user input requesting a subscription to the specialized query type, the subscriber/provider server stores an indication that a user has subscribed to the specialized query type.

28. The system of claim 17, wherein, responsive to user input requesting deletion of a subscription to the specialized query type, the subscriber/provider server deletes a previously stored indication that a user has subscribed to the specialized query type.

29. A system of generating specialized search results in response to patterned queries, comprising:
  a front-end server, for receiving a search query and transmitting it to at least one trust server having a computer readable storage medium; and
  the at least one trust server, for:
  comparing the search query to a stored query pattern associated with a specialized query type, wherein the stored query pattern comprises:
  at least one data object having a type;
  at least one query name by which the data object can be recognized in the search query; and
  at least one attribute of the data object to be included in the specialized results, the specialized query pattern associated with a specialized results pattern comprising at least one attribute of the data object in the query pattern;
  responsive to the search query matching the stored query pattern:
  generating at least one search result according to the specialized results pattern, including at least one attribute of the data object in the query pattern; and
  generating at least one generic search result; and
  wherein the front-end server transmits the at least one search result generated according to the specialized results pattern and the at least one generic search result to a client for output.

30. A computer program product for generating specialized search results in response to patterned queries, comprising:
  a computer-readable storage medium; and
  computer program code, encoded on the storage medium, for:
  receiving, for a specialized query type, a query pattern for which specialized results are to be displayed, wherein the query pattern comprises:
  at least one data object having a type;
  at least one query name by which the data object can be recognized in a search query; and
  at least one attribute of the data object to be included in the specialized results;
  receiving, for the specialized query type, a specialized results pattern to be used in response to receiving a search query matching the query pattern, wherein the specialized results pattern comprises at least one attribute of the data object in the query pattern; and
  storing the query pattern and the specialized results pattern in a record associated with the specialized query type.

31. The computer program product of claim 30, wherein the query pattern comprises an XML file.

32. The computer program product of claim 30, further comprising computer program code for:
  receiving at least one supporting data object for the specialized query type; and
  storing the supporting data object.

33. The computer program product of claim 30, wherein the query pattern comprises at least a text string.

34. The computer program product of claim 30, further comprising computer program code for:
  comparing the search query to the stored query pattern associated with the specialized query type;
  responsive to the search query matching at least one query name of the stored query pattern, generating at least one search result according to the specialized results pattern, including at least one attribute of the data object in the query pattern;
  responsive to the search query not matching the stored query pattern, generating at least one generic search result; and
  outputting the generated at least one search result.

35. The computer program product of claim 30, further comprising computer program code for:
  receiving a search query;
  comparing the search query to the stored query pattern associated with the specialized query type;
  responsive to the search query matching at least one query name of the stored query pattern:
  generating at least one search result according to the specialized results pattern, including at least one attribute of the data object in the query pattern; and
  concurrently outputting a plurality of search results comprising the at least one search result generated according to the specialized results pattern and the at least one generic search result.

36. The computer program product of claim 35, wherein the computer program code for concurrently outputting a plurality of search results comprises computer program code for outputting a web page comprising the at least one search result generated according to the specialized results pattern and the at least one generic search result.

37. The computer program product of claim 30, further comprising computer program code for, responsive to user input requesting a subscription to the specialized query type, storing an indication that a user has subscribed to the specialized query type.

38. The computer program product of claim 30, further comprising computer program code for, responsive to user input requesting deletion of a subscription to the specialized query type, deleting a previously stored indication that a user has subscribed to the specialized query type.

* * * * *

UNITED STATES PATENT AND TRADEMARK OFFICE
CERTIFICATE OF CORRECTION

PATENT NO. : 7,593,939 B2
APPLICATION NO. : 11/694490
DATED : September 22, 2009
INVENTOR(S) : Weininger et al.

Page 1 of 1

It is certified that error appears in the above-identified patent and that said Letters Patent is hereby corrected as shown below:

Column 20, Claim 21, line 28, before "wherein the front-end" delete "and".

Signed and Sealed this

Sixteenth Day of March, 2010

David J. Kappos
*Director of the United States Patent and Trademark Office*